(12) United States Patent
Evans, V et al.

(10) Patent No.: US 10,333,576 B2
(45) Date of Patent: Jun. 25, 2019

(54) ACCESSORIES FOR ELECTRONIC USER DEVICES HAVING WIRELESS ACCESSORY BUSES

(71) Applicant: Essential Products, Inc., Palo Alto, CA (US)

(72) Inventors: David John Evans, V, Palo Alto, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/612,827

(22) Filed: Jun. 2, 2017

(65) Prior Publication Data

US 2017/0272113 A1 Sep. 21, 2017

Related U.S. Application Data

(63) Continuation of application No. 15/336,657, filed on Oct. 27, 2016, now Pat. No. 9,838,064.

(Continued)

(51) Int. Cl.
*H04B 1/3888* (2015.01)
*H04W 4/80* (2018.01)
(Continued)

(52) U.S. Cl.
CPC ............ *H04B 1/3888* (2013.01); *H02J 7/025* (2013.01); *H02J 50/10* (2016.02); *H04B 1/3818* (2015.01);
(Continued)

(58) Field of Classification Search
CPC .......... H04M 1/72527; H04M 1/7253; H04M 1/0254; H04M 1/0264; H04M 1/0266;
(Continued)

(56) References Cited

U.S. PATENT DOCUMENTS 9,300,342 B2 3/2016 Schlub et al.
2009/0096413 A1 4/2009 Partovi et al.
(Continued)

OTHER PUBLICATIONS

Notice of Allowance dated Aug. 31, 2017, for U.S. Appl. No. 15/336,657 of Evans V et al. filed Oct. 27, 2016.
(Continued)

*Primary Examiner* — Shaima Q Aminzay
(74) *Attorney, Agent, or Firm* — Perkins Coie LLP

(57) ABSTRACT

Various embodiments concern a wireless accessory bus for a user device that enables accessories to be easily and securely attached to the user device. More specifically, the wireless accessory bus enables data to be wirelessly transmitted between the accessory and the user device when the accessory and the user device are located within close proximity to one another (e.g., when the accessory is securely attached to the wireless accessory bus). Power could also be wirelessly transferred from the user device to the accessory (or vice versa). In some embodiments, the user device includes fastening component(s) (e.g., magnets) that allow the user device and the accessory to be magnetically secured to one another. The accessory typically enables the user device to readily utilize a new functionality or an improvement to an existing functionality.

13 Claims, 8 Drawing Sheets

Related U.S. Application Data

(60) Provisional application No. 62/318,130, filed on Apr. 4, 2016, provisional application No. 62/249,130, filed on Oct. 30, 2015.

(51) Int. Cl.
| | | |
|---|---|---|
| *H04B 1/3818* | (2015.01) | |
| *H02J 50/10* | (2016.01) | |
| *H02J 7/02* | (2016.01) | |
| *H04B 1/3883* | (2015.01) | |
| *H04B 5/00* | (2006.01) | |
| *H04L 29/08* | (2006.01) | |
| *H04M 1/02* | (2006.01) | |
| *H04M 1/725* | (2006.01) | |
| *H02J 50/90* | (2016.01) | |

(52) U.S. Cl.
CPC ......... *H04B 1/3883* (2013.01); *H04B 5/0031* (2013.01); *H04L 67/34* (2013.01); *H04M 1/0254* (2013.01); *H04M 1/0264* (2013.01); *H04M 1/0266* (2013.01); *H04M 1/72527* (2013.01); *H04W 4/80* (2018.02); *H02J 50/90* (2016.02)

(58) Field of Classification Search
CPC ........... H04M 1/0274; H04M 2250/12; H04M 1/003; H04M 2250/04; H04N 5/2258; H04N 7/181; H04N 21/21805; H04N 5/2254; H04N 5/2257
USPC ....................................... 455/556.1
See application file for complete search history.

(56) References Cited

U.S. PATENT DOCUMENTS

| | | |
|---|---|---|
| 2010/0081473 A1 | 4/2010 | Chatterjee et al. |
| 2010/0083012 A1 | 4/2010 | Corbridge et al. |
| 2010/0131691 A1 | 5/2010 | Hornyak et al. |
| 2010/0146308 A1 | 6/2010 | Gioscia et al. |
| 2012/0095852 A1 | 4/2012 | Bauer et al. |
| 2012/0202427 A1 | 8/2012 | Gioscia et al. |
| 2014/0059263 A1 | 2/2014 | Rosenberg et al. |
| 2014/0086586 A1* | 3/2014 | Voutilainen .......... H04M 1/003 398/115 |
| 2014/0295758 A1 | 10/2014 | Pedersen |
| 2014/0315592 A1 | 10/2014 | Schlub et al. |
| 2015/0091508 A1 | 4/2015 | Meunier et al. |
| 2015/0195926 A1* | 7/2015 | Kandur Raja ........ G06F 1/1605 348/373 |
| 2016/0190861 A1 | 6/2016 | Cha |
| 2017/0126268 A1 | 5/2017 | Evans, V et al. |
| 2017/0149474 A1 | 5/2017 | Kim |

OTHER PUBLICATIONS

Non-Final Office Action dated Jan. 25, 2018 for U.S. Appl. No. 15/727,514 of Evans et al., filed Oct. 6, 2017.
U.S. Appl. No. 15/727,514 of Evans et al. filed Oct. 6, 2017.
Final Office Action dated May 4, 2017, for U.S. Appl. No. 15/336,657 of Evans V et al. filed Oct. 27, 2016.
Non-Final Office Action dated Dec. 22, 2016 for U.S. Appl. No. 15/336,657 of Evans, D.J. et al. filed Oct. 27, 2016.
International Search Report and Written Opinion dated Jan. 27, 2017, for International Application No. PCT/US2016/59509, 9 pages.

* cited by examiner

700

701
Acquire a user device that includes a wireless accessory bus

702
Enable user to securely attach an accessory to the wireless accessory bus

703
Monitor whether the accessory has been attached to the wireless accessory bus

704
Electrically couple power supply of the user device to power receiver of the accessory

705
Communicatively couple wireless transceiver of the user device to wireless transceiver of the accessory

706
Automatically permit user device to utilize a new or improved functionality enabled by the accessory

FIG. 7

ACCESSORIES FOR ELECTRONIC USER DEVICES HAVING WIRELESS ACCESSORY BUSES

CROSS-REFERENCE TO RELATED APPLICATIONS

This application is a continuation of U.S. patent application Ser. No. 15/336,657, entitled "WIRELESS ACCESSORY BUS FOR ELECTRONIC DEVICES" filed on Oct. 27, 2016, which claims priority to and the benefit of U.S. Provisional Application 62/249,130, entitled "MOBILE DEVICES AND MOBILE DEVICE ACCESSORIES" filed on Oct. 30, 2015, and U.S. Provisional Application 62/318,130, entitled "WIRELESS ACCESSORY BUS FOR ELECTRONIC DEVICES" filed on Apr. 4, 2016.

RELATED FIELD

Various embodiments relate generally to accessory busses for electronic devices. More specifically, various embodiments relate to accessory busses capable of wirelessly coupling an accessory to an electronic device.

BACKGROUND

Many electronic devices enable users to add a new functionality or improve an existing functionality by adding an accessory. For example, video recorders ("webcams"), input devices (e.g., mice and keyboards), and external storage can easily be connected to personal computers. These accessories are typically connected to electronic devices through a wired connection (e.g., via a Universal Serial Bus ("USB") port) or a wireless connection (e.g., via a WiFi adapter or a Bluetooth chip).

Wired connections ensure that an accessory is able to consistently receive sufficient power from the electrical device. For example, an external storage device may be configured to transfer data and receive power via a single wired connection with a USB port of the user device. However, wired connections may be undesirable from an aesthetic perspective and are often impractical in certain situations (e.g., when clear channels between the accessory and user device are not available). Wireless connections, meanwhile, may have poor connectivity and/or limited bandwidth in some scenarios, which impacts a user's ability to utilize the accessory. Moreover, wireless accessories typically require a dedicated power source that requires its own wired connection (e.g., a dedicated AC/DC adapter) or must be periodically replaced (e.g., a battery).

SUMMARY

Techniques for securely attaching an accessory to a wireless accessory bus of a user device are described herein. More specifically, the wireless accessory bus enables data to be wirelessly transmitted between the accessory and the user device when the accessory and the user device are located within close proximity to one another (e.g., when the accessory is securely attached to the wireless accessory bus). Power could also be wirelessly transferred from the user device to the accessory (or vice versa). That is, the user device could serve as the power source for the accessory.

A communication channel and/or a power transfer channel could be initiated in response to determining the accessory has been securely attached to the wireless accessory bus of the user device. In some embodiments, the accessory and the user device are magnetically affixed to one another. For example, both the accessory and the user device may include magnets that, when aligned and placed within close proximity to one another, cause the accessory to be affixed to the user device in a predetermined orientation.

The accessory typically provides the user device with a new functionality or improves an existing functionality. For example, the accessory could include a depth sensor/camera, an external storage device, a digital camera, an auxiliary power supply, a display, etc. The accessory could also be integrated into a case or cover adapted for the user device. For example, an accessory that includes an external storage device could be integrated into a case for a mobile phone, thereby providing the mobile phone with additional storage capabilities.

BRIEF DESCRIPTION OF THE DRAWINGS

One or more embodiments of the present invention are illustrated by way of example and not limitation in the figures of the accompanying drawings, in which like references indicate similar elements.

FIG. 7 depicts a process for allowing a user device to utilize a new or improved functionality enabled by an accessory.

DETAILED DESCRIPTION

Figure 1:
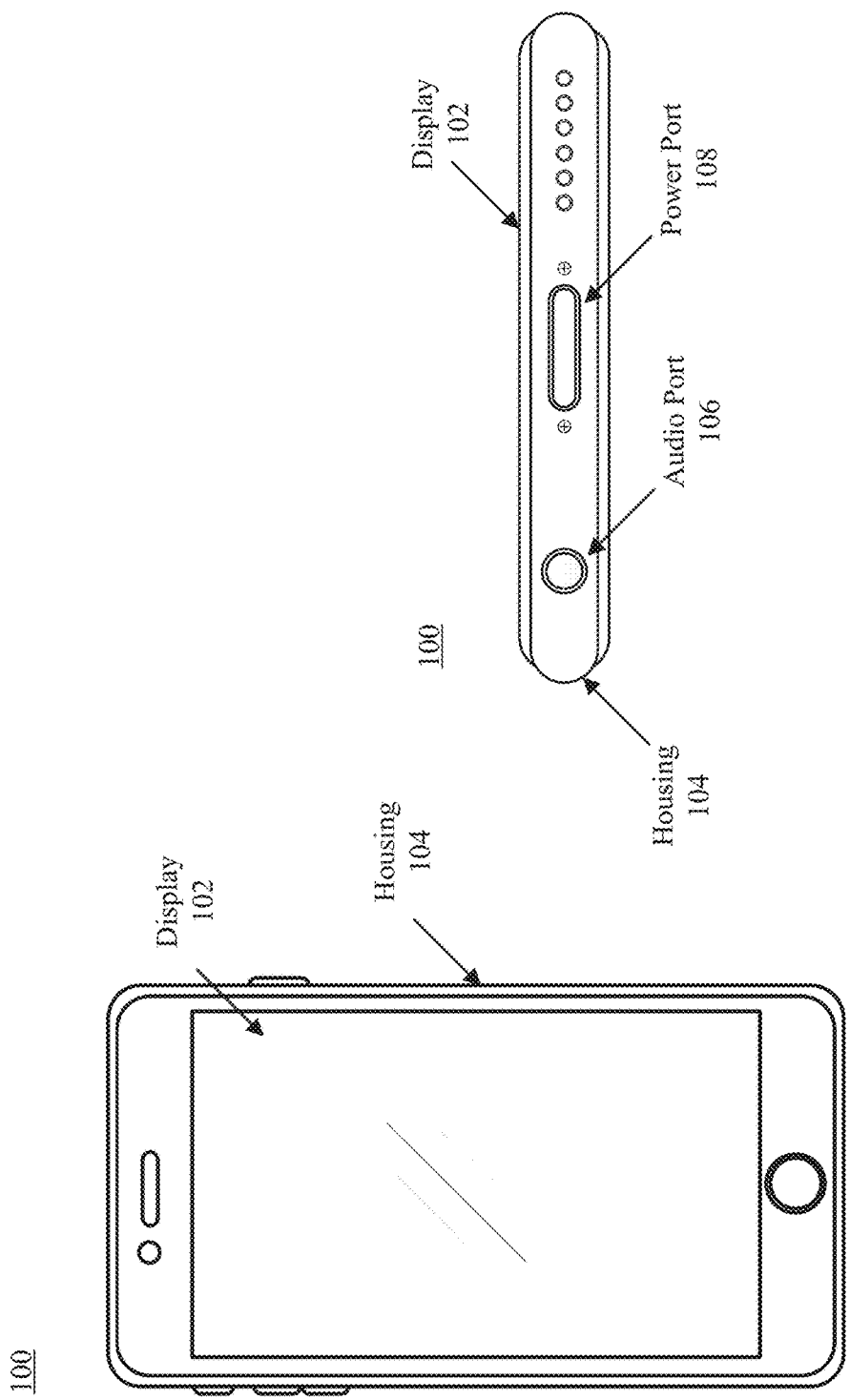
FIG. 1A is a front view of a conventional user device that includes a display disposed in a housing that protects various components that reside within the user device.
FIG. 1B is a bottom view of the conventional user device that depicts an audio port and a power port.

Techniques for securely attaching an accessory to a wireless accessory bus of a user device are described herein. More specifically, the wireless accessory bus enables data to be wirelessly transmitted between the accessory and the user device when the accessory and the user device are located within close proximity to one another (e.g., when the accessory is securely attached to the wireless accessory bus). Power could also be wirelessly transferred from the user device to the accessory (or vice versa).

These techniques can be used with any electronic device (also referred to herein as a "user device") for which it is desirable to have new or improved functionalities, such as personal computers, tablets, personal digital assistants (PDAs), mobile phones, game consoles (e.g., Sony PlayStation or Microsoft Xbox), mobile gaming devices (e.g. Sony PSP or Nintendo 3DS), music players (e.g., Apple iPod Touch), wearable electronic devices (e.g., watches), network-connected ("smart") devices (e.g., televisions), and other portable electronic devices.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments necessarily mutually exclusive of other embodiments. Moreover, various features are described that may be exhibited by some embodiments and not by others. Similarly, various requirements are described that may be requirements for some embodiments and not for other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of or connection between the elements can be physical, logical, or a combination thereof. For example, two components may be coupled directly to one another or via one or more intermediary channels or components. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components. Modules are typically functional components that can generate useful data or other output using specified input(s). A module may or may not be self-contained. An application program (also called an "application") may include one or more modules, or a module can include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that an element or feature can be described in more than one way.

Consequently, alternative language and synonyms may be used for any one or more of the terms discussed herein, and special significance is not to be placed on whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to the various embodiments given in this specification.

System Overview

FIG. 1A is a front view of a conventional user device 100 that includes a display 102 disposed within a housing 106 that protects various components (e.g., sensors, connectors, power supply) that reside within the user device 100. The housing 106 is typically composed of a protective substrate, such as metal or plastic. In some embodiments, the display 102 is touch sensitive and is configured to generate signals responsive to a user contacting the outer surface of the display 102.

The user device could include other features as well, such as a camera and a touch-sensitive button that are offset from the display 102. The camera and/or touch-sensitive button may be located within an opaque border that surrounds the display 102 and is not responsive to user interactions (i.e., is not touch sensitive). The opaque border is often used to hide the various components that reside within the user device 100.

FIG. 1B is a bottom view of the conventional user device 100 that depicts an audio port 106 and a power port 108. The audio port 106 (also referred to as an "audio jack") is a receptacle or jack that can be used to transmit analog signals, such as audio. More specifically, the audio port 106 typically includes two, three, or four contacts that enable audio signals to be readily transmitted when an appropriate plug is inserted into the audio port 106. For example, most speakers and headphones include a plug designed for a 3.5 mm audio jack.

The power port 108 (also referred to as a "power jack") enables the user device 100 to be physically connected directly to a power source. For example, the power port 108 could be capable of interfacing with a micro-USB adapter, a 30-pin adapter, or a proprietary bus (e.g., Apple Lightning). Together, the audio port 106 and power port 108 can enable accessories (e.g., headphones, storage devices) to be fastened directly to the conventional user device 100. However, as noted above, physical (i.e., "wired") connections are often undesirable for both aesthetic and functional reasons.

Although FIGS. 1A-B include an illustration of a mobile phone, the techniques described herein can also be used with other electronic devices for which it is desirable to eliminate physical ports for transferring data and/or power. For example, the same techniques could be utilized with personal computers, tablets, personal digital assistants (PDAs), mobile phones, game consoles (e.g., Sony PlayStation or Microsoft Xbox), mobile gaming devices (e.g. Sony PSP or Nintendo 3DS), music players (e.g., Apple iPod Touch), wearable electronic devices (e.g., watches), network-connected ("smart") devices (e.g., televisions), and other portable electronic devices.

Figure 2:
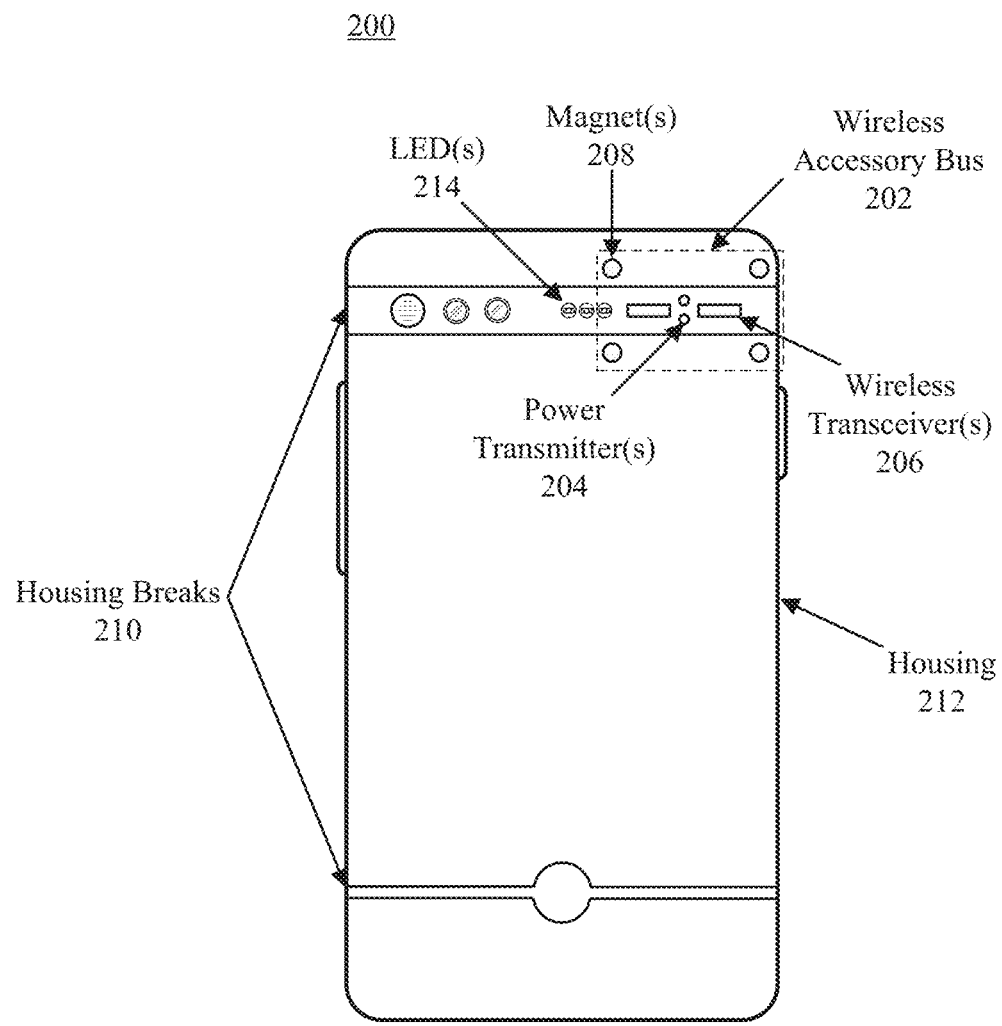
FIG. 2 is a rear view of a user device that includes a wireless accessory bus capable of receiving an accessory.

FIG. 2 is a rear view of a user device 200 that includes a wireless accessory bus 202 capable of receiving an accessory. The wireless accessory bus 202 enables data and/or power to be wirelessly transferred from the user device 200 to the accessory (or vice versa) when the user device 200 and the accessory are within close proximity to one another. For example, a bi-directional communication channel may be established when the accessory is securely attached to the wireless accessory bus 202.

As shown in FIG. 2, the term "wireless accessory bus" refers generally to an area of the user device 200 that is configured to securely receive an accessory. The wireless accessory bus 202 can include one or more power transmitters 204, one or more wireless transceivers 206, and/or one or more magnets 208 (collectively referred to as the "bus components").

Some of these bus components could be at least partially exposed. For example, the magnet(s) 208 may be exposed through opening(s) in the housing 212. Additionally or alternatively, some of these bus components could be secured within the housing 212. In such embodiments, the bus components may be selected in order to compensate for signal degradation that occurs as the data signals and/or power signals traverse through the housing 212 or a substrate laid within a break 210 in the housing 212. The substrate may be an optically-clear substrate, such as glass or plastic.

The power transmitter(s) 204 are configured to transfer power from a power supply (e.g., a battery) retained within the housing 212 to an accessory via a wired or wireless electrical coupling. For example, the power transmitter(s) 204 may include one or more electrical contacts (e.g., pin terminals) that are able to physically contact one or more electrical contacts of the accessory. As another example, the power transmitter(s) 204 may include integrated circuits ("chips") that are able to wirelessly transmit power from the user device to the accessory. The wireless power transmitter(s) 204 may be configured to transmit power in accordance with the Qi standard developed by the Wireless Power Consortium or some other wireless power standard.

The wireless transceiver(s) 206 are communicatively coupled to one or more wireless transceivers of the accessory. For the purposes of illustration and simplification, the term "wireless transceiver" is intended to cover components able to transmit data, receive data, or both. Moreover, a single wireless transceiver could include distinct components responsible for transmitting and receiving data signals.

Upon determining an accessory has been securely attached to the wireless accessory bus 202, the wireless transceiver(s) 206 may be configured to automatically initiate a connection with the wireless transceiver(s) of the accessory. For example, if the accessory includes multiple digital cameras, image data may be received by the wireless transceiver(s) 206 from the accessory. In some embodiments, an application associated with the accessory could also be downloaded from a network-accessible environment (e.g., a digital distribution platform such as a website or an app store) and/or launched in response to determining the accessory has been securely attached to the wireless accessory bus 202.

Oftentimes, the wireless accessory bus 202 includes a fastening component that enables the accessory to be securely attached to the user device 200. Here, for example, magnet(s) 208 are arranged around the wireless accessory bus 202 so that the accessory is in a predetermined orientation when attached to the user device 200. However, other materials and components could also be used. For example, a magnetic film could be deposited on an outer or inner surface of the housing 212 or a mechanical track, clips, etc., could be affixed to the housing 212. The predetermined orientation may cause a wireless transmitter of the accessory to be aligned with, or disposed in close proximity to, the wireless transceiver(s) 206 of the user device 200.

The housing 212 also typically includes one or more breaks 210. These break(s) 210 may be necessary for permitting antenna(s) within the housing to send and receive signals or could be for stylistic/aesthetic purposes. These break(s) 210 typically include a substrate layer comprised of a non-metal material, such as glass or plastic, that allows signals to more readily pass through.

As shown in FIG. 2, the wireless accessory bus 202 could be positioned in or around one of the break(s) 210. In such embodiments, one or more light emitting diodes (LEDs) 214 may be disposed underneath the substrate layer and configured to convey information about the user device 200 and/or the accessory. For example, the LEDs 214 could illuminate when the accessory is brought near the user device 200, thereby indicating where the accessory should be attached. As another example, the LEDs 214 may be able to convey operational information, such as whether the accessory is receiving sufficient power, is able to transfer data signals to the user device, is currently available for use, etc.

Figure 3:
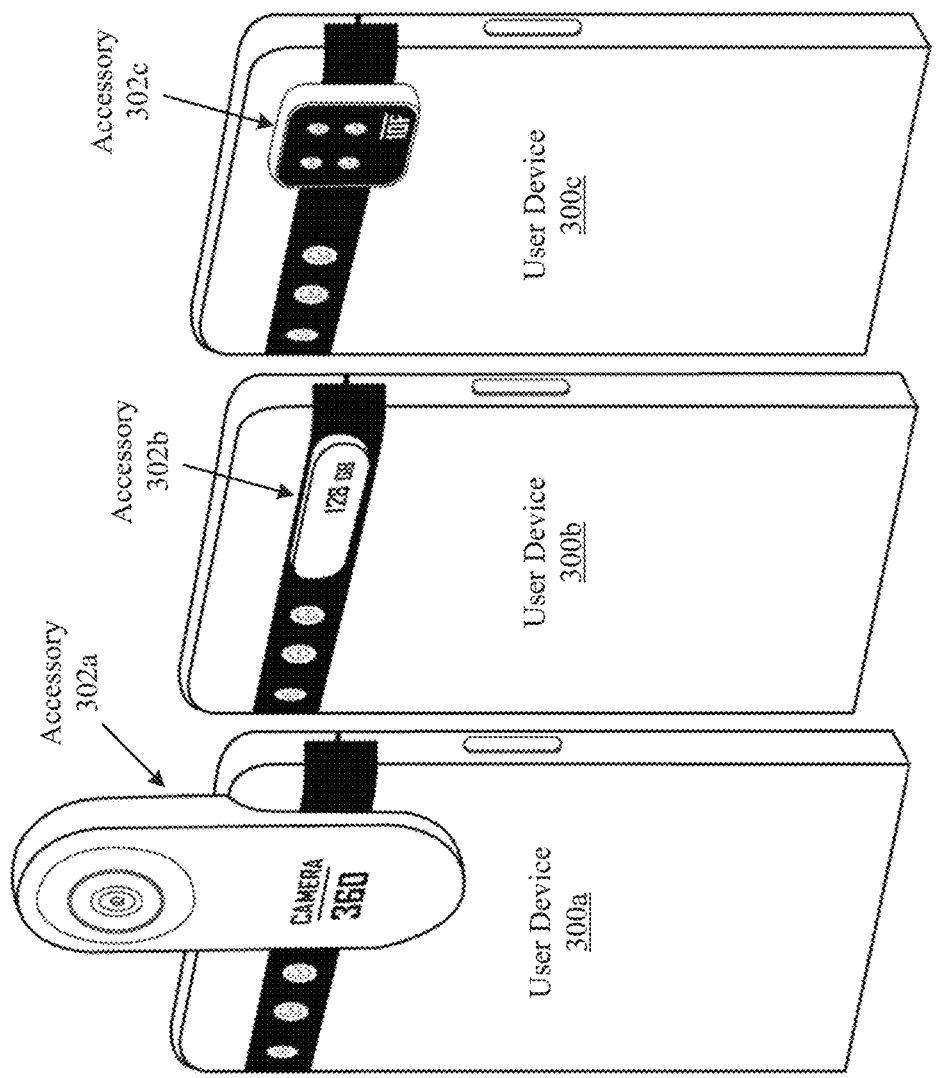
FIG. 3 depicts various accessories that are attached to user devices that include wireless accessory busses.

FIG. 3 depicts various accessories 302a-c that are attached to user devices 300a-c that include wireless accessory busses. The accessories 302a-c are normally designed so that each accessory can be easily attached to and removed from the wireless accessory bus without modification. Moreover, a user device is normally configured to automatically establish a communication channel between the user device and the accessory and automatically begin transferring power to the accessory. Consequently, the accessory may be usable immediately or soon after attachment to the wireless accessory bus of the user device.

As described above, the accessory, the user device, or both could include fastening components (e.g., magnets or mechanical connectors) that allow the accessory and the user device to be securely and detachably connected to one another. Said another way, the accessory and the user device may be capable of being readily and repeatedly attached and detached from one another. Consequently, a user could elect to quickly utilize a series of accessories in succession by a single user device.

In some embodiments, an application associated with an accessory is initiated in response to determining the accessory has been attached to the wireless accessory bus of the user device. For example, attaching accessory 302a (a 360° camera) or accessory 302c (a multi-LED illumination source) may prompt a camera application to be invoked, while attaching accessory 302b (an external storage device) may prompt a data storage application to be invoked.

Figure 4:
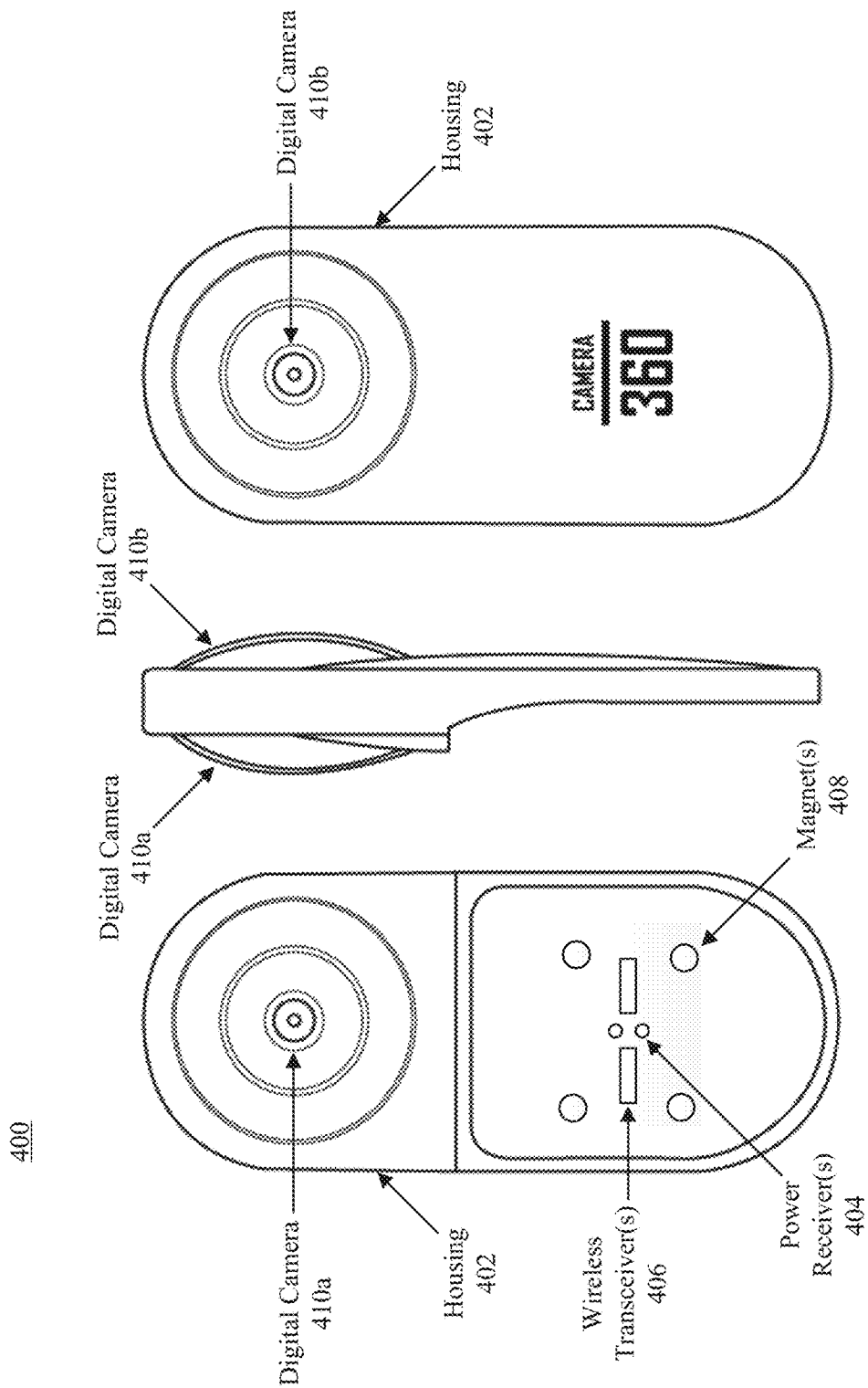
FIG. 4 includes front, side, rear views of a camera accessory having multiple digital cameras that are capable of capturing a substantially 360° field of view.

FIG. 4 includes front, side, rear views of a camera accessory 400 having multiple digital cameras 410a-b that are capable of capturing a substantially 360° field of view. The camera accessory 400 can include one or more digital cameras that are configured to capture an image and are secured within a housing 402. Images captured by the digital camera(s) typically have different characteristics than those captured by the camera of the user device. For example, the images may have a higher resolution, be 3D/stereoscopic in nature, etc. Here, for instance, multiple digital cameras 410a-b are arranged to capture an image having a substantially 360° field of view ("FOV").

In some embodiments, the camera accessory 400 also includes an image processing module that is able to analyze and process the image data prior to transmission to the user device. For example, the image processing module may be configured to stitch images together taken by multiple distinct cameras. Alternatively, unprocessed image data could be transmitted directly to the user device for processing.

The camera accessory 400 can also include one or more power receivers 404, one or more wireless transceivers 406, and one or more magnets 408 (collectively referred to as the "accessory components"). Some of these accessory components could be at least partially exposed. For example, the magnet(s) 408 may be exposed through opening(s) in the housing 402. Additionally or alternatively, some of these accessory components could be secured within the housing 402.

The power receiver(s) 404 can be configured to receive power that is transferred by a source external from the accessory, such as the user device. As described above, the power can be transferred via a physical connection (e.g., by a physical coupling of electrical contacts) or a wireless connection (e.g., by a power transmitter chip). The wireless transceiver(s) 406 are operable to transmit data signals to wireless transceiver(s) of the user device. The magnet(s) 408, meanwhile, enable the camera accessory 400 to be securely attached to a wireless accessory bus of a user device. Oftentimes, the user device will include magnet(s) that are positioned in a similar arrangement so that as the camera accessory 400 and user device are drawn toward one another when located within a close proximity.

Note that the camera accessory 400 is simply one example of an accessory that could be attached to a user device. Other accessories could include a depth sensor/camera, an external storage device, an auxiliary power supply, an infrared sensor/camera, a laser rangefinder, a structured-light three-dimensional (3D) scanner, a memory card reader, an audio output device (e.g., speaker, headphones), or a supplemental display (e.g., an electronic ink display or LCD display). One skilled in the art will recognize that many other accessories offering different functionalities could also utilize the technology described herein.

Figure 5:
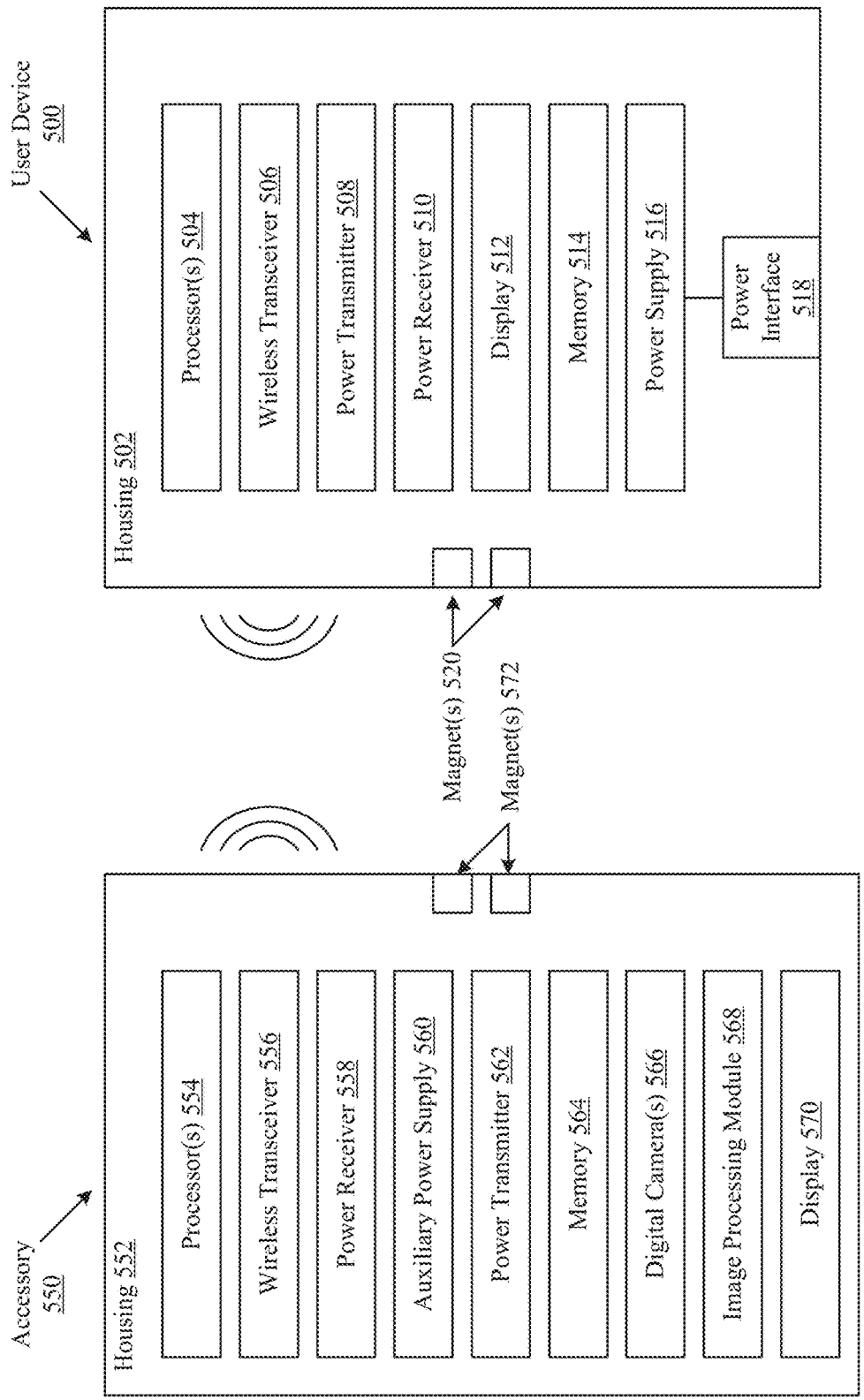
FIG. 5 is a high-level block diagram illustrating exemplary components of a user device and an accessory.

FIG. 5 is a high-level block diagram illustrating exemplary components of a user device 500 and an accessory 550. Various embodiments of the user device 500 and the accessory 550 can include some or all of these components, as well as additional components not illustrated here.

The user device 500 can include one or more processors 504, a wireless transceiver 506, a power transmitter 508, a power receiver 510, a display 512, a memory 514, and/or a power supply 516 electrically coupled to a power interface 518. These components can be retained within a housing 502 that includes one or more magnets 520 arranged to securely receive the accessory 550. The wireless transceiver 506 can be configured to automatically establish a wireless connection with the wireless transceiver 556 of the accessory 550. The wireless transceivers 506, 556 allow data to be transmitted between the accessory 550 and the user device 500. More specifically, the wireless transceiver(s) 506, 556 may communicate with one another using a bi-directional communication protocol, such as Near Field Communication (NFC), wireless Universal Serial Bus (USB), Bluetooth, WiFi, a cellular data protocol (e.g., 3G or 4G), or a proprietary point-to-point protocol.

In some embodiments, the accessory 550 does not include a dedicated power source, and thus must receive power from the user device 500. The power transmitter 508 may be configured to transfer power from the power supply 516 of the user device 500 to the accessory 550. For example, the power transmitter 508 of the user device and the power receiver 558 of the accessory 550 may be electrically coupled to one another via a physical connection (e.g., by electrical contacts) or a wireless connection (e.g., by power transmitter chips).

The accessory 550 could also include an auxiliary power supply 560 and a power transmitter 562 that allow the accessory to serve as a supplemental power source for the user device 500. In such embodiments, the user device includes a power receiver 510 that is able to receive power (e.g., wirelessly or via electrical contacts) from the accessory 550. Oftentimes, the user device 500 will include a display 510, a memory 514, and a power supply 516 that is electrically coupled to a power interface 518 (e.g., a physical power port or a Qi-compliant wireless receiver). The memory 514 can include, for example, an operating system executed by the user device 500 and one or more applications that are associated with various accessories. The user device 500 may be configured to invoke a particular application upon determining the corresponding accessory has been attached to the wireless accessory bus. The power supply 516, meanwhile, may include a rechargeable lithium-ion (Li-Ion) battery, a rechargeable nickel-metal hydride (NiMH) battery, a rechargeable nickel-cadmium (NiCad) battery, or any other power source suitable for electronic user devices.

In some embodiments, the wireless accessory bus is designed so that multiple accessories can simultaneously be attached to, and used by, the user device 500. For example, a user may elect to concurrently utilize camera accessory 302a and external storage accessory 302b of FIG. 3. In such embodiments, the magnet(s) 520 and/or wireless transceiver 506 may be arranged so that multiple accessories can be utilized without damaging throughput or performance.

The accessory 550 can include one or more processors 554, a wireless transceiver 556, a power receiver 558, an auxiliary power supply 560, a power transmitter 562, a memory 564, one or more digital cameras 566, an image processing module 568, and/or a display 570. These components can be retained within a housing 552 that includes one or more magnets 572 arranged so as to enable the accessory 550 to be securely attached to the electronic device 500.

As noted above, various embodiments of the accessory 550 can include some or all of these components, as well as other additional components not illustrated here. For example, an accessory intended to serve as a supplemental display to the user device 500 may include processor(s) 554, a wireless transceiver 556, a power receiver 558, a memory 564, and a display 570. As another example, an accessory designed to capture images may include processor(s) 554, a wireless transceiver 556, a power receiver 558, a memory 564, digital camera(s) 566, and an image processing module 568.

Note that in some embodiments the accessory 550 (or some subset of its components) could be integrated into a case, cover, or clip designed for the user device. That is, cases, covers, clips, etc., may be designed to make use of the wireless accessory bus when affixed to the user device 500. For example, an auxiliary power supply 560 or additional memory 564 could be integrated into a case for a mobile phone. The auxiliary power supply 560 and/or additional memory 564 may be usable by the mobile phone so long as the mobile phone remains within the case.

Figure 6:
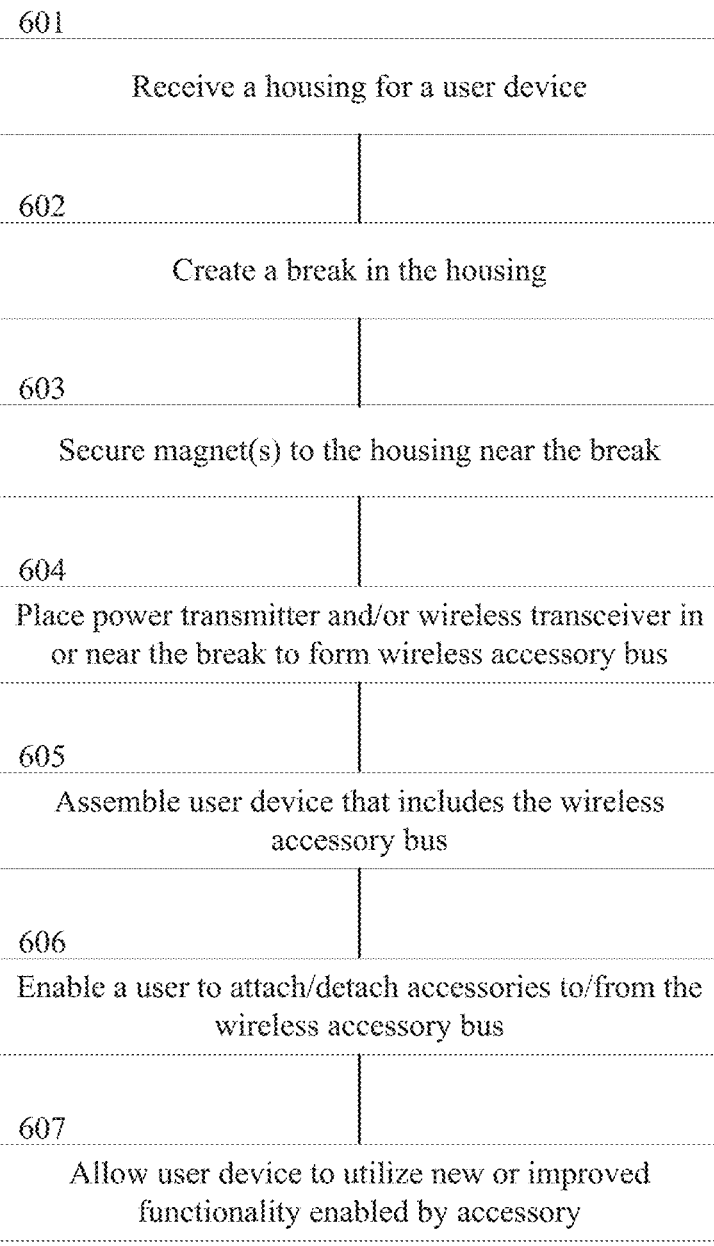
FIG. 6 depicts a process for manufacturing a user device that includes a wireless accessory bus to which accessories can be detachably connected.

FIG. 6 depicts a process 600 for manufacturing a user device that includes a wireless accessory bus to which accessories can be detachably connected. A housing is initially received (e.g., by a manufacturer) that is designed to protect various components (e.g., sensors, connectors, power supply) that reside within the user device (step 601). In some embodiments, a break is created in the housing (step 602). The break may be necessary for permitting antenna(s)

within the housing to send and receive signals or could be for stylistic/aesthetic purposes.

Fastening components can then be affixed to the housing. For example, in some embodiments one or more magnets are secured to the inner surface of the housing near the break (step 603). The magnet(s) permit accessories to be securely attached to the housing without requiring mechanical clips or connectors. Additionally or alternatively, a magnetic film could be deposited along the outer or inner surface of the housing. The user device can also be designed so that a power transmitter and/or a wireless transceiver are disposed in or near the break (step 604). As shown in FIG. 2, the fastening component(s) (e.g., magnets), power transmitter, and/or wireless transceiver collectively form a wireless accessory bus to which accessories can be magnetically, electrically, and/or communicatively coupled.

The user device, which includes a wireless accessory bus, can then be assembled and provided to a user (step 605). The wireless accessory bus permits the user to readily and repeatedly attach and detach the user device from accessories (step 606). For example, as the user brings an accessory and the user device within a close proximity to one another, the magnet(s) secured to the inner surface of the housing may magnetically draw the accessory toward the wireless accessory bus. When the accessory is attached to the user device, the user device may automatically allow the user to utilize a new or improved functionality enabled by the accessory (step 607). For example, the user device may be able to capture an image using a camera accessory or project audio using a speaker accessory without requiring modification/installation of any hardware or software.

FIG. 7 depicts a process 700 for allowing a user device to utilize a new or improved functionality enabled by an accessory. A user initially acquires a user device that includes a wireless accessory bus (step 701). The user device could be, for example, user device 200 of FIG. 2 or any other suitable electronic device. The wireless accessory bus enables the user to attach an accessory to the user device (step 702). The accessory and the user device could be magnetically adhered or physically coupled (e.g., via clips, connectors, or a mechanical track) to one another.

Typically, the user device continually monitors whether an accessory has been attached to the wireless accessory bus (step 703). For example, a processor within the user device may be configured to detect when an accessory is placed on or near the wireless accessory bus. More specifically, a wireless transceiver within the user device may be able to detect when another wireless transceiver comes within a certain proximity, thereby indicating the presence of an accessory. When an accessory is attached to the wireless accessory bus, the user device can electrically couple the power supply of the user device to a power receiver of the accessory (step 704). For example, the power supply of the user device may be coupled to a power transmitter that is configured to wirelessly transfer power to the power receiver of the accessory.

The user device may also be configured to communicatively couple a wireless transceiver of the user device to a wireless transceiver of the accessory (step 705). The wireless transceivers can permit the user device and the accessory to communicate with one another without a physical connection between the two components. After initiating a communication channel between the user device and the accessory, the user device can allow the user device to utilize a new or improved functionality enabled by the accessory (step 706). In some embodiments, this is done automatically without requiring further user input. That is, the user may be able to utilize the accessory without manually connecting/modifying physical components or installing appropriate software. For example, the user device may automatically recognize and utilize additional memory provided by an external storage accessory.

Unless contrary to physical possibility, it is envisioned that the steps described above may be performed in various sequences and combinations. For instance, the user device may not need to form an electrical coupling with the accessory if the accessory includes its own power. Other steps could also be included in some embodiments. For example, the user device may automatically initiate an application associated with the accessory attached to the wireless accessory bus. More specifically, when a camera accessory (e.g., camera accessory 400 of FIG. 4) is attached the user device, the user device (and, more specifically, an operating system executed by the user device) may invoke and execute a camera application and/or an image processing application.

Processing System

Figure 8:
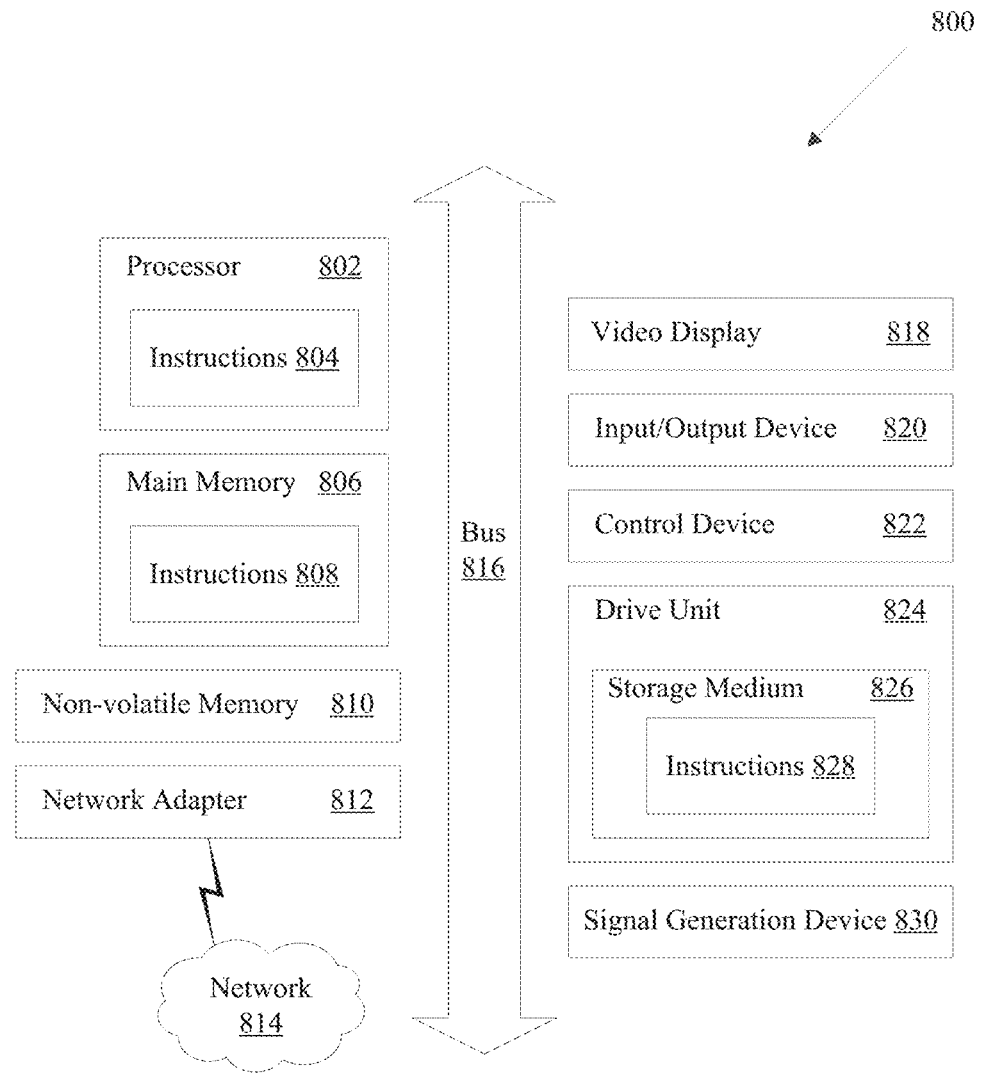
FIG. 8 is a block diagram illustrating an example of a processing system in which at least some operations described herein can be implemented.

FIG. 8 is a block diagram illustrating an example of a processing system 800 in which at least some operations described herein can be implemented. The computing system may include one or more central processing units ("processors") 802, main memory 806, non-volatile memory 810, network adapter 812 (e.g., network interfaces), video display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents any one or more separate physical buses, point to point connections, or both connected by appropriate bridges, adapters, or controllers. The bus 816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 800 operates as part of a user device (e.g., user device 200 of FIG. 2), although the processing system 800 may be connected (e.g., wired or wirelessly) to the user device. In a networked deployment, the processing system 800 may operate in the capacity of a server or a client machine in a client-server network environment, or as a peer machine in a peer-to-peer (or distributed) network environment.

The processing system 800 may be a server computer, a client computer, a personal computer (PC), a tablet PC, a laptop computer, a personal digital assistant (PDA), a mobile telephone, an iPhone®, an iPad®, a Blackberry®, a processor, a telephone, a web appliance, a network router, switch or bridge, a console, a hand-held console, a gaming device, a music player, or any portable, device or any machine capable of executing a set of instructions (sequential or otherwise) that specify actions to be taken by the processing system.

While the main memory 806, non-volatile memory 810, and storage medium 826 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 804, 808, 828) set at various times in various memory and storage devices in a computer, and that, when read and executed by one or more processing units or processors 802, cause the processing system 800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 810, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 812 enables the processing system 800 to mediate data in a network 814 with an entity that is external to the processing system 800 through any known and/or convenient communications protocol supported by the processing system 800 and the external entity. The network adapter 812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A camera accessory for an electronic device, the camera accessory comprising:
   a housing that includes an attachment mechanism configured to secure the camera accessory to a corresponding attachment mechanism of the electronic device;
   an electrical contact configured to receive power from the electronic device upon maintaining a physical connection with a corresponding electrical contact of the electronic device;
   multiple digital cameras that each have a field of view, wherein the multiple digital cameras are arranged so that the multiple fields of view form a 360° field of view of an ambient environment;
   a memory configured to store image data generated by the multiple digital cameras; and
   a processor that effects a bi-directional exchange of information with the electronic device when the attachment mechanism of the housing is secured to the corresponding attachment mechanism of the electronic device.

2. The camera accessory of claim 1, wherein the attachment mechanism maintains the camera accessory in a predetermined orientation relative to the corresponding attachment mechanism of the electronic device.

3. The camera accessory of claim 1, wherein the attachment mechanism causes the multiple digital cameras to be positioned outside a perimeter of the electronic device.

4. The camera accessory of claim 1, wherein the multiple digital cameras are controllable by a computer program executing in the electronic device.

5. The camera accessory of claim 1, further comprising:
an image processing module configured to process the image data generated by the multiple digital cameras.

6. The camera accessory of claim 1, wherein the processor is configured to transmit the image data generated by the multiple digital cameras directly to the electronic device for processing.

7. The camera accessory of claim 1, wherein the electrical contact is one of multiple electrical contacts accessible through the housing.

8. A camera accessory for a mobile phone, the camera accessory comprising:
an attachment mechanism configured to secure the camera accessory to a corresponding attachment mechanism of the mobile phone in a predetermined orientation;
an electrical contact configured to receive power from the mobile phone upon maintaining a physical connection with a corresponding electrical contact of the mobile phone;
multiple digital cameras that each have a field of view, wherein the multiple digital cameras are arranged so that the multiple fields of view form a 360° field of view of an ambient environment; and
a processor that effects a bi-directional exchange of information with the mobile phone when the attachment mechanism is secured to the corresponding attachment mechanism of the mobile phone.

9. The camera accessory of claim 8, wherein the attachment mechanism causes the multiple digital cameras to be positioned outside a perimeter of the mobile phone.

10. The camera accessory of claim 9, wherein the multiple digital cameras include a first digital camera and a second digital camera, and wherein the attachment mechanism causes the first digital camera to be co-planar with a front of the mobile phone and the second digital camera to be co-planar with a rear of the mobile phone.

11. The camera accessory of claim 8, wherein the electrical contact is arranged along a surface of the attachment mechanism.

12. The camera accessory of claim 8, wherein the attachment mechanism is detachably connectable to the corresponding attachment mechanism of the mobile phone.

13. The camera accessory of claim 8, wherein the multiple digital cameras are controllable via a computer program executing in the mobile phone that is also responsible for controlling a front-facing camera, a rear-facing camera, or any combination thereof.

* * * * *